(12) United States Patent
Galuten

(10) Patent No.: US 7,574,434 B2
(45) Date of Patent: Aug. 11, 2009

(54) METHOD AND SYSTEM FOR NAVIGATING AND SELECTING MEDIA FROM LARGE DATA SETS

(75) Inventor: Albhy Galuten, Santa Monica, CA (US)

(73) Assignees: Sony Corporation, Tokyo (JP); Sony Electronics Inc., Parkridge, NJ (US)

( * ) Notice: Subject to any disclaimer, the term of this patent is extended or adjusted under 35 U.S.C. 154(b) by 358 days.

(21) Appl. No.: 11/212,527

(22) Filed: Aug. 26, 2005

(65) Prior Publication Data
US 2006/0195438 A1 Aug. 31, 2006

Related U.S. Application Data

(60) Provisional application No. 60/656,777, filed on Feb. 25, 2005.

(51) Int. Cl.
*G06F 17/30* (2006.01)
(52) U.S. Cl. ......................................................... 707/4
(58) Field of Classification Search ................ 707/1, 707/2, 7, 10, 100, 203, 4; 84/609; 386/96
See application file for complete search history.

(56) References Cited

U.S. PATENT DOCUMENTS

| | | | |
|---|---|---|---|
| 2002/0010740 A1* | 1/2002 | Kikuchi et al. | 709/203 |
| 2002/0129693 A1* | 9/2002 | Wilks | 84/609 |
| 2003/0086699 A1* | 5/2003 | Benyamin et al. | 386/96 |
| 2003/0120673 A1* | 6/2003 | Ashby et al. | 707/100 |
| 2005/0049941 A1* | 3/2005 | Kaplan | 705/27 |

* cited by examiner

*Primary Examiner*—Etienne P LeRoux
(74) *Attorney, Agent, or Firm*—Haverstock & Owens LLP

(57) ABSTRACT

Some embodiments of the invention provide a method of accessing a data set. The data set includes a set of data elements. The method collects the data elements of the data set. The method receives a lens item. The lens item provides a set of parameters for searching the data set. The method searches the data set by using the lens item to identify a data subset. The method sorts a list of data elements based on the data subset. The sorting generates an ordered list. The method filters the data subset. Filtering the data subset comprises excluding the data elements that are not relevant to the lens item. The method presents the ordered list in a first column of a matrix. The matrix has several cells. The cells of the matrix are based on the data subset. The method selects column headings for the matrix and populates the cells of the matrix. Some embodiments provide a system for providing access to a data set. The system has a set of data elements that comprises a first data source. The system has a first device for collecting the set of data elements. The first device receives a first lens item for searching the data elements. The first device filters the data elements by using the first lens item to generate a first subset. The first device presents the first subset in a variety of views for navigation through the first subset.

39 Claims, 12 Drawing Sheets

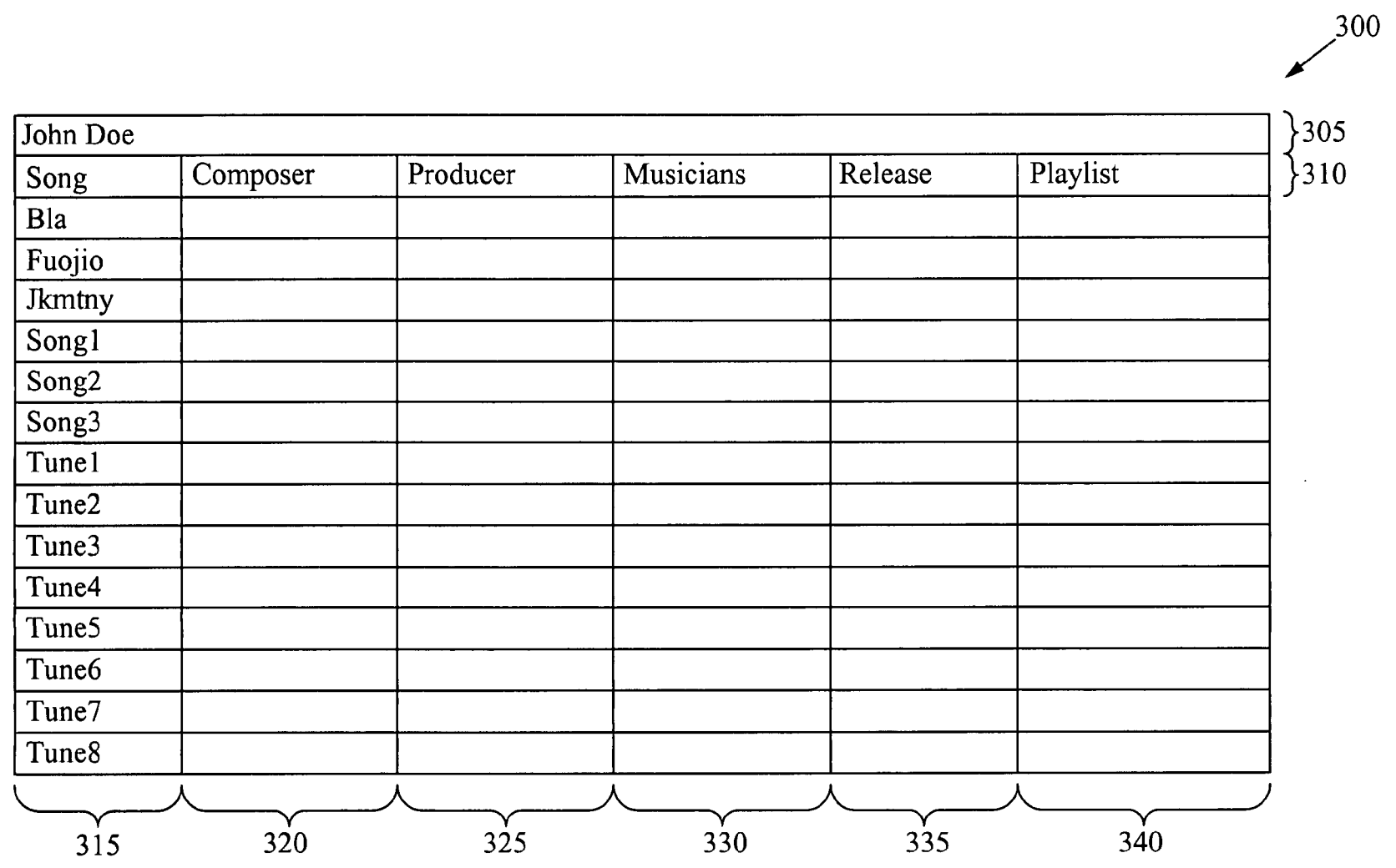

| John Doe | | | | | |
|---|---|---|---|---|---|
| Song | Composer | Producer | Musicians | Release | Playlist |
| Bla | | | | | |
| Fuojio | | | | | |
| Jkmtny | | | | | |
| Song1 | | | | | |
| Song2 | | | | | |
| Song3 | | | | | |
| Tune1 | | | | | |
| Tune2 | | | | | |
| Tune3 | | | | | |
| Tune4 | | | | | |
| Tune5 | | | | | |
| Tune6 | | | | | |
| Tune7 | | | | | |
| Tune8 | | | | | |

Fig. 3

| John Doe | | | | | |
|---|---|---|---|---|---|
| Song | Composer | Producer | Musicians | Release | Playlist |
| Bla | John Doe → | John Doe | Ron Wilcox → | 01/03/1999 → | Happy Songs → |
| Fuojio | Jack Sprat → | John Doe → | Ron Wilcox → | 02/12/2001 → | Driving Songs → |
| Jkmtny | Harry Belafonte → | John Doe → | Ron Wilcox → | 04/06/2001 → | Dance 1 → |
| Song1 | John Doe | Albhy Galuten | Ron Wilcox → | 05/09/2000 → | Old Album → |
| Song2 | John Doe → | Albhy Galuten | Ron Wilcox → | 05/09/2000 → | Old Album → |
| Song3 | Mary Meeker | Albhy Galuten | Ron Wilcox → | 05/09/2000 → | Old Album → |
| Tune1 | John Doe → | John Doe → | Ron Wilcox → | 11/11/2002 → | New Album → |
| Tune2 | Jack Sprat → | John Doe → | Ron Wilcox → | 11/11/2002 → | New Album → |
| Tune3 | Harry Belafonte → | John Doe → | John Doe → | 11/11/2002 → | New Album → |
| Tune4 | John Doe → | Albhy Galuten | Ron Wilcox → | 11/11/2002 → | New Album → |
| Tune5 | John Doe → | Albhy Galuten | Ron Wilcox → | 11/11/2002 → | New Album → |
| Tune6 | Mary Meeker | Albhy Galuten | John Doe → | 11/11/2002 → | New Album → |
| Tune7 | John Doe → | John Doe → | Ron Wilcox → | 11/11/2002 → | New Album → |
| Tune8 | Jack Sprat → | John Doe → | Ron Wilcox → | 11/11/2002 → | New Album → |

Fig. 4

| John Doe | | | | 505 |
|---|---|---|---|---|
| Song | Composer | Producer | Musicians | 510 |
| Bla | John Doe ⬇ | John Doe ⬇ | Ron Wilcox ⬇ | 545 |
| Fuojio | Jack Sprat ⬇ | John Doe ⬇ | Ron Wilcox ⬇ | |
| Jkmtny | Harry Belafonte | John Doe ⬇ | Ron Wilcox ⬇ | |
| Song1 | John Doe | Albhy Galuten | Ron Wilcox ⬇ | |
| Song2 | John Doe ⬇ | Albhy Galuten | Ron Wilcox ⬇ | |
| Song3 | Mary Meeker | Albhy Galutenr | Ron Wilcox ⬇ | |
| Tune1 | John Doe ⬇ | John Doe ⬇ | Ron Wilcox ⬇ | |
| Tune2 | Jack Sprat ⬇ | John Doe ⬇ | Ron Wilcox ⬇ | |
| Tune3 | Harry Belafonte | John Doe ⬇ | John Doe ⬇ | |
| Tune4 | John Doe ⬇ | Albhy Galuten | Ron Wilcox ⬇ | |
| Tune5 | John Doe | Albhy Galuten | Ron Wilcox ⬇ | |
| Tune6 | Mary Meeker | Albhy Galuten | John Doe ⬇ | |
| Tune7 | John Doe ⬇ | John Doe ⬇ | Ron Wilcox ⬇ | |
| Tune8 | Jack Sprat ⬇ | John Doe ⬇ | Ron Wilcox ⬇ | |
| Johnny 1 | John Doe ⬇ | Albhy Galuten | Ron Wilcox ⬇ | |
| Johnny 2 | John Doe ⬇ | Albhy Galuten | Ron Wilcox ⬇ | |
| Johnny 3 | Mary Meeker | Albhy Galuten | John Doe ⬇ | |
| Johnny 4 | John Doe ⬇ | John Doe ⬇ | Ron Wilcox ⬇ | |
| Johnny 5 | Jack Sprat ⬇ | John Doe ⬇ | Ron Wilcox ⬇ | |
| Johnny 6 | John Doe ⬇ | Albhy Galuten | Ron Wilcox ⬇ | |
| Johnny 7 | John Doe ⬇ | Albhy Galuten | Ron Wilcox ⬇ | |
| Johnny 8 | Mary Meeker | Albhy Galuten | John Doe ⬇ | |
| Johnny 9 | John Doe ⬇ | John Doe ⬇ | Ron Wilcox ⬇ | |
| Johnny 10 | Jack Sprat ⬇ | John Doe ⬇ | Ron Wilcox ⬇ | |
| Johnny 11 | John Doe ⬇ | Albhy Galuten | Ron Wilcox ⬇ | |
| Johnny 12 | John Doe ⬇ | Albhy Galuten | Ron Wilcox ⬇ | |
| Johnny 13 | Mary Meeker | Albhy Galuten | Ron Wilcox ⬇ | |
| Johnny 14 | John Doe ⬇ | John Doe ⬇ | John Doe ⬇ | |
| 515 | 520 | 525 | 530 | |

Fig. 5

METHOD AND SYSTEM FOR NAVIGATING AND SELECTING MEDIA FROM LARGE DATA SETS

RELATED APPLICATIONS

This patent application claims priority under 35 U.S.C. §119(e) of the co-owned U.S. Provisional Patent Application No. 60/656,777, filed Feb. 25, 2005, entitled "METHOD AND SYSTEM FOR NAVIGATING AND SELECTING MEDIA FROM LARGE DATA SETS," which is hereby incorporated by reference.

FIELD OF THE INVENTION

The present invention relates to accessing data. In particular, the present invention relates to the field of quickly accessing various multiple data types by searching, sorting, filtering, and by using other methods.

BACKGROUND OF THE INVENTION

Storage technology continues to grow in size and decrease in cost. Currently, a typical consumer and many enterprises have many thousands or even millions of different stored media elements. These stored media elements typically include audio, video, image, and other multimedia files. Many of the stored media elements have associated metadata, while some do not. The metadata associated with various stored media will only increase with the proliferation of the stored media and with the use of both the stored media and associated metadata. For instance, companies such as CDDB currently use consumers to add metadata associated with the consumers' stored audio data such as compact disc (CD) recordings. That data is made available to other owners of the same CD recording to populate the information regarding the other CD owners' stored audio data. There are also new technologies that use heuristic algorithms to classify media by using its associated content, e.g. by using sunsets, waterfalls, or portraits in photos to classify the photos by content, or by using voice recognition to classify films by content. Further, more explicit metadata are being added to media elements every day. For instance, tags for the director, publisher, actors, etc., are being added to various digital media to further identify the work.

A user of the stored media, whether in the form of an individual consumer or a large enterprise, faces some challenges when attempting to locate a desired item among many stored media elements. Today, users can search the Internet by using, for example, a general purpose search engine. Additionally, users are beginning to more effectively search their own hard drives and other storage media. These searches are based on a few key words and do not use a robust set of metadata. Moreover, even as the metadata associated with various media elements improves, there is no simple mechanism for finding specific content from among the volumes of stored media, which in some instances, take the form of tens of thousands of audio files, clips, television shows, movies, image files, books, games, personal files and documents that a particular user needs to access at any given time. For instance, a typical home consumer currently has access to personal media players that store a few thousand media elements, e.g., audio files. However, these are only navigable using crude interfaces that are typically far removed from the associative manner in which people typically remember and recall data. Associative storage and recall of data typically involves a temporal component. For instance, I was doing this at that time near when I was doing this other thing.

Moreover, the user interfaces currently associated with large data sets, e.g., stored libraries of music, movies, books, which are the collected works of an equally large number of directors, actors, musicians, writers, etc., are lacking in the ability to quickly find and sort the various data appropriately. These deficiencies of large media devices rival or even surpass the deficiencies of the rudimentary interfaces typical of handheld portable players. For instance, most current home media viewers, tuners, and/or players are controlled by using a remote control. However, A/V component remote controls have not typically been designed, or known, for the ability to manage large data sets.

SUMMARY OF THE INVENTION

Some embodiments of the invention provide a method of accessing a data set. The data set includes a set of data elements. The method collects the data elements of the data set. The method receives a lens item. The lens item provides a set of parameters for searching the data set. The method searches the data set by using the lens item to identify a data subset. The method sorts a list of data elements based on the data subset. The sorting generates an ordered list. The method filters the data subset. Filtering the data subset comprises excluding the data elements that are not relevant to the lens item. The method presents the ordered list in a first column of a matrix. The matrix has several cells. The cells of the matrix are based on the data subset. The method selects column headings for the matrix and populates the cells of the matrix.

Some embodiments provide a method of selecting a first data element in a data set. The data set includes several data elements. The method collects several data elements. The method limits the data set of data elements to a subset. The method excludes a second data element from the subset. The method selects a set of columns. A column has several data elements. The method orders the data elements in a list for a column in the set of columns. The method presents the ordered list in a matrix that includes the selected set of columns. The method selects column headings for each column in the matrix and populates several cells in the matrix.

Some embodiments provide a system for providing access to a data set. The system has a set of data elements that comprises a first data source. The system has a first device for collecting the set of data elements. The first device receives a first lens item for searching the data elements. The first device filters the data elements by using the first lens item to generate a first subset. The first device presents the first subset in a variety of views for navigation through the first subset.

Some embodiments provide a user interface device. The user interface device has a communications module for collecting a data set. The data set is available from several sources. The user interface device includes a processor for executing a set of instructions that limit the data set into a first subset based on a first lens item. The user interface device has a storage module for storing the first subset and a display screen for presenting a matrix. The matrix comprises a set of data cells. The matrix represents the first subset. The user interface device includes a set of controls for navigating through the matrix of data cells.

Some embodiments provide a user interface for presentation of data. The user interface has a lens field for receiving and presenting a lens item. The lens item includes a data element. The user interface also includes a matrix of data cells that represent a subset of a larger data set. The matrix has a first column and a set of column headings. The lens item has a relationship to one or more data cells in the matrix and the matrix presents an organization of the data cells based on the relationship.

BRIEF DESCRIPTION OF THE DRAWINGS

The novel features of the invention are set forth in the appended claims. However, for purpose of explanation, several embodiments of the invention are set forth in the following figures.

FIG. 3 illustrates a lens field containing a lens item and a data matrix with column headings that are relevant to the lens item according to some embodiments of the invention.

FIG. 4 illustrates a landscape view of a data matrix representing a data subset.

FIG. 5 illustrates a portrait view of the data matrix of FIG. 4.

DETAILED DESCRIPTION OF THE INVENTION

Figure 1:
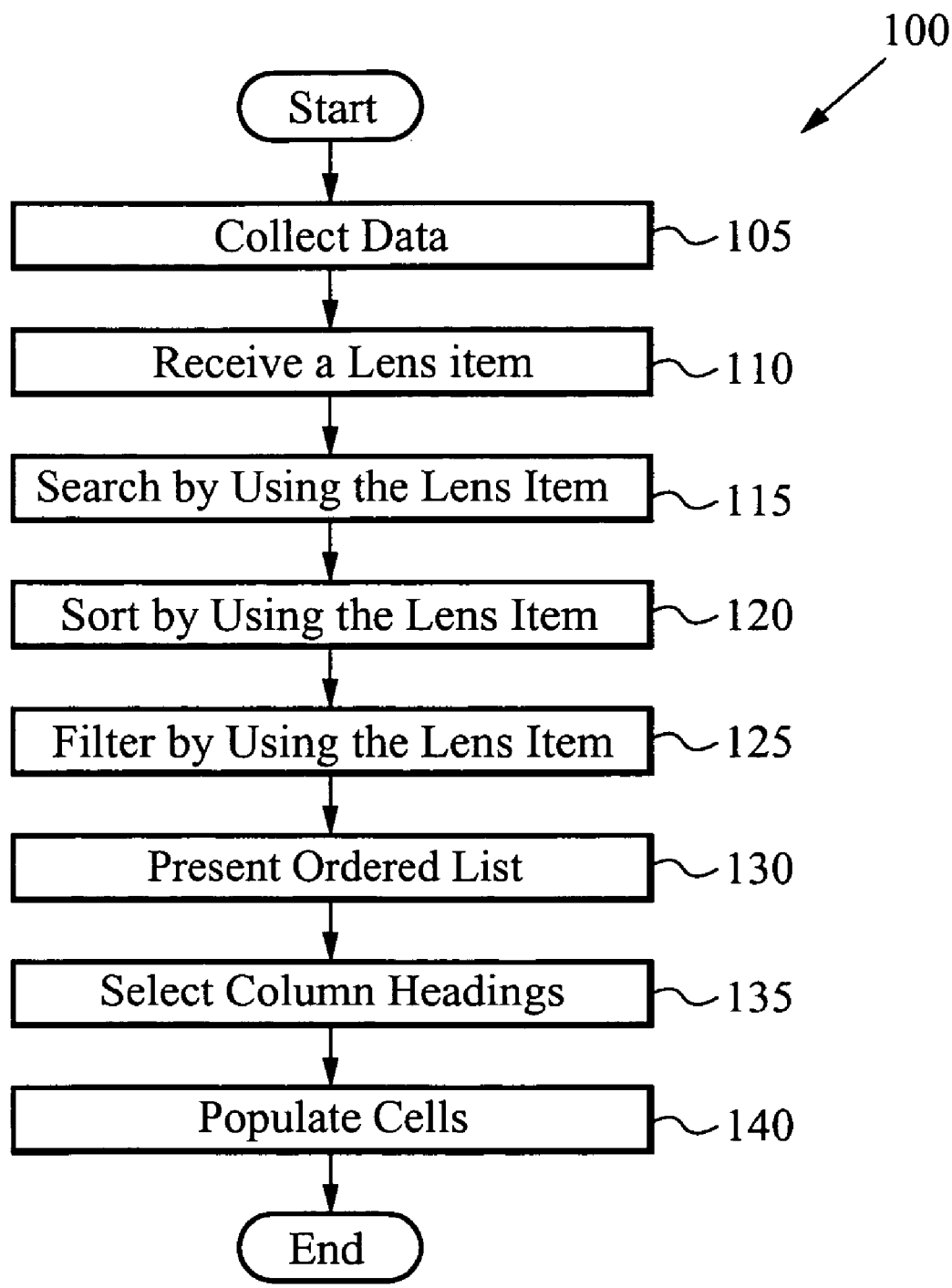
FIG. 1 is a process flow that illustrates a method of presenting data according to some embodiments of the invention.

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail. Section I below describes the methods some embodiments employ to navigate through a large data set. Section II describes the data matrix some embodiments present for convenient data access, viewing, and navigation. Section III describes the user interface devices of some embodiments and Section IV lists some particular advantages of the invention.

Some embodiments of the invention provide a method and system for accessing data. These embodiments search, sort, filter, display, and/or render the data dynamically and/or associatively. In some embodiments the data includes media data, including multimedia. The data of some embodiments is based on metadata. In some embodiments, the metadata is associated with a data subset. Some embodiments heuristically derive the metadata to associate to the data subset, while some embodiments retrieve the metadata from a source external to the data subset. Some embodiments present the data in a subset represented by a matrix. The matrix format of these embodiments is similar to a spreadsheet format. In these embodiments, the data in a cell of the matrix updates dynamically based on a number of parameters. The dynamic presentation of the data allows a user quick and intuitive access to the data and to the sub-levels of nested data.

Some embodiments provide an interface for searching, filtering, sorting, rendering, and/or displaying data. The interface of some embodiments is referred to as a lens interface. The lens interface of these embodiments provides a means to query for specific data and cull other data that is not of interest and/or deemed not relevant. Specifically, the lens interface of some embodiments includes a filter function. The filter function of some embodiments operates by using a large set of content elements and associated metadata. In these embodiments, the filter function limits a subset of the data set to only those data elements that have relevance to a set of predetermined and/or dynamic parameters. The filter function of some embodiments operates by using the associated metadata.

The lens interface is typically used to quickly parse through a large data set. The large data set is typically comprised of data elements stored at a plurality of data sources. The data sources of some embodiments include a home and/or local server, a single computer or multiple computers connected on a local area network, one or more portable device(s), and/or one or more data sources on a wide area network, or a network of networks such as the Internet. Data sources on the Internet include one or more content provider services or are related to search technologies.

The lens interface of some embodiments includes a display function for displaying a subset of data in a manner that is readily understandable. In particular, some embodiments present a large set of data in smaller subsets. Even so, the smaller data subsets of these embodiments typically contain numerous fields. Thus, the lens interface of some embodiments provides a user with convenient presentations of the data subset, as well as a set of navigational tools. The lens interface of these embodiments is set to perform actions on a set of specific fields. For instance, in some embodiments where the data involves electronic content, the lens interface is set to provide the data by a data category or by an individual data element. In some embodiments, the data crosses genres. The lens interface of these embodiments provides the heterogeneous data in a coherent fashion.

Some embodiments allow the lens interface to find a relevant data item and then base further functionality on that item. The functional data element is referred to as the lens item in some embodiments. In these embodiments, the data set is then searched, sorted, and/or filtered by using the currently identified and/or selected lens item. In some embodiments the functionality is based on associations. In these embodiments, the associated data are presented in the lens interface. Some embodiments order the presented data subset(s). The lens interface of some embodiments provides the ability to view a sorted and filtered data subset in various orders, e.g., alphabetical, temporal (based upon, for example, date of creation, time of last rendering, etc.), and/or by another ordering. These embodiments are particularly effective in leveraging the associative nature of recall and memory. In some embodiments, the process repeats such that a data element presented in a data subset is selected as the next lens item for providing an additional layer of functionality, and so forth.

Some embodiments provide a user interface device to access, navigate, present, and/or view the data in particular ways according to user preference. Some embodiments provide additional functionality based on the orientation of the user interface device. The user interface device of some embodiments enables a user to navigate and/or manipulate a large data set with minimal user input. In some embodiments, the user interface device provides a binding function to bind the user interface to external devices including external displays. The binding function of some embodiments allows the user to access and/or control the external devices.

The user interface device of some embodiments allows a user to navigate at variable speeds through information, for example, through the data matrices mentioned above. Some embodiments provide the ability to dynamically adjust the aspect ratio of the presented data in an internal and/or external display. Some embodiments include interfaces for both a small form portable device and for larger devices such as, e.g., an external display, television, projector, monitor, personal computer, or other external device. Some embodiments operate as a remote control device for one or more external devices.

I. Method of Accessing, Organizing, and/or Presenting Data

Some embodiments provide a method of accessing, organizing, and presenting for viewing an entire data set. Typically the data set is large. For some embodiments, the accessing, organizing, and presenting includes dynamically searching, sorting, and filtering the large data set such that only those item(s) of interest out of the entire large data set are presented for viewing at a particular time.

A. Example Using a Data Category as the Lens Item

Some embodiments provide for a field of focus for performing such tasks as searching, sorting, and filtering. In some embodiments, the focus field is referred to as a lens field. In these embodiments, an item within the focus field is called the lens item. FIG. 1 is a process flow that illustrates the method that some embodiments employ to access, organize, and present the data. As shown in FIG. 1, the process 100 of these embodiments begins at step 105 where data is collected from the available data sources. These data sources include, for example, home servers, personal computers in the form of desktop and laptop or notebook computers, portable devices, and Internet services, that contain or are associated with various multiple media elements. When the data have been collected from the available sources, the process 100 transitions to step 110, where a lens item is received. As mentioned above, the lens item is a data element by which the user focuses the organization and presentation of the data. Upon receiving the lens item, the process 100 transitions to step 115, where the collected data set is searched. Some embodiments search for relationships by using the lens item. In some embodiments, the relationships are associative. Next, the collected data are sorted at the step 120. After the data are sorted, the sorted data is filtered using the lens item at the step 125. If, for instance, the lens item is a particular category of data, the filtering at step 125 limits the data to those data elements that are members of the category. Some embodiments limit the data to the lens item by removing those data elements that are not members of the category, while some embodiments limit the data by excluding the irrelevant data. For instance, if the lens item of interest is the category "Songwriters," the list of data elements is limited to songwriters, their songs, and the recordings of those songs. The data subset for songwriters does not include photos, musicians, movies, directors, etc., that are not typically associated with the songwriters category. Some embodiments exclude the non-typical associations.

Once the data is filtered at step 125, an ordered list containing the set of filtered data elements that remain after filtering is presented at the step 130. Some embodiments present the ordered list alphabetically by name, while some embodiments present the ordered list chronologically by date of release, or creation, and/or by the time of last rendering by the current system. Further, some embodiments present the ordered list based on heuristically defined algorithms that relate to the content of the ordered data, such as, for example, to color, content mood, and embedded text. Some embodiments present the ordered list in the first column of a data matrix. In these embodiments, at step 135, column headings are selected based on the metadata associated with the individual data elements in each additional column of the data matrix. For example, if the first column is a list of songs, the related columns are typically based on metadata associated with the songs. Typical column headings for data associated with songs include, for example, composer, lyricist, recording artist, and date of release.

After the column headings are selected at step 135, the cells in each column are populated with the relevant metadata at step 140. Some embodiments populate the cells based on the intersection of the data element in the leftmost (first) column for a particular row and the metadata defined in the column heading associated with that particular cell. For example, if the lens item in the first column is the category "Songs" and a first cell in the first column contains "Sergeant Pepper's Lonely Hearts Club Band," then a second cell along the same row as the first cell, under a second column entitled "Artist," contains the "Beatles." After the cells are populated, the process 100 concludes.

In some embodiments, the sorting at step 120 includes ordering the data in the columns from most to least useful. The ordering of some embodiments is based on a set of predetermined relevancies, which are set by a software design that implements the process 100. For instance, if the first column heading is "Movie Title," the next most important column heading by default in some embodiments is "Lead Actor," followed in some embodiments by "Supporting Actor," followed by "Director," and so forth. In some embodiments, ordering is based on user selectable preferences. These user specified column headings are similar to the predetermined column headings described above except the user in these embodiments sets the relevancies at various times by using a set of user configurable preferences. In some embodiments, ordering is based on usage. As the user selects data elements from various columns for playback or to act as the lens item, these embodiments track from which column headings data are most often selected and place those column headings further to the left. Some embodiments place the most often selected column(s) closest to the first column.

Some embodiments include a combination of the ordering described above. For instance, the software designer initially sets the defaults, which are then later changed through direct manipulation by the user and/or by the process implementation to reflect the usage behavior of the particular user.

B. Example Using an Individual Data Element as the Lens Item

In some embodiments, the lens item contains an individual data element, such as, for example, a particular song, a writer, a chapter in a book, or an artist. In these embodiments, the presented data elements are limited to those with a predetermined relationship to the lens item. For example, if a song serves as the lens item, a set of playlists presented to the user are limited to only those playlists that contain the particular song serving as the lens item. If an actor is the lens item, a set of movies presented to the user is limited to those movies in which the actor appeared, or to which the actor serving as the lens item had some predefined relationship. If a feature of a photograph serves as the lens item, a set of photographs presented to the user is limited to only those photographs that contain the particular feature of interest. In some embodiments, data relevant to the lens item crosses genres or data types. For example, a user interested in a particular person provides the person of interest's name as the lens item. In some cases, the available data set contains information that the particular person of interest has performed as a musician, as an actor, and is also a writer of magazine articles. These embodiments present a reduced subset from the set of all data available to the user. The data subset of these embodiments typically contains a set of the column headings that are properly associated with the person's name.

Figure 2:
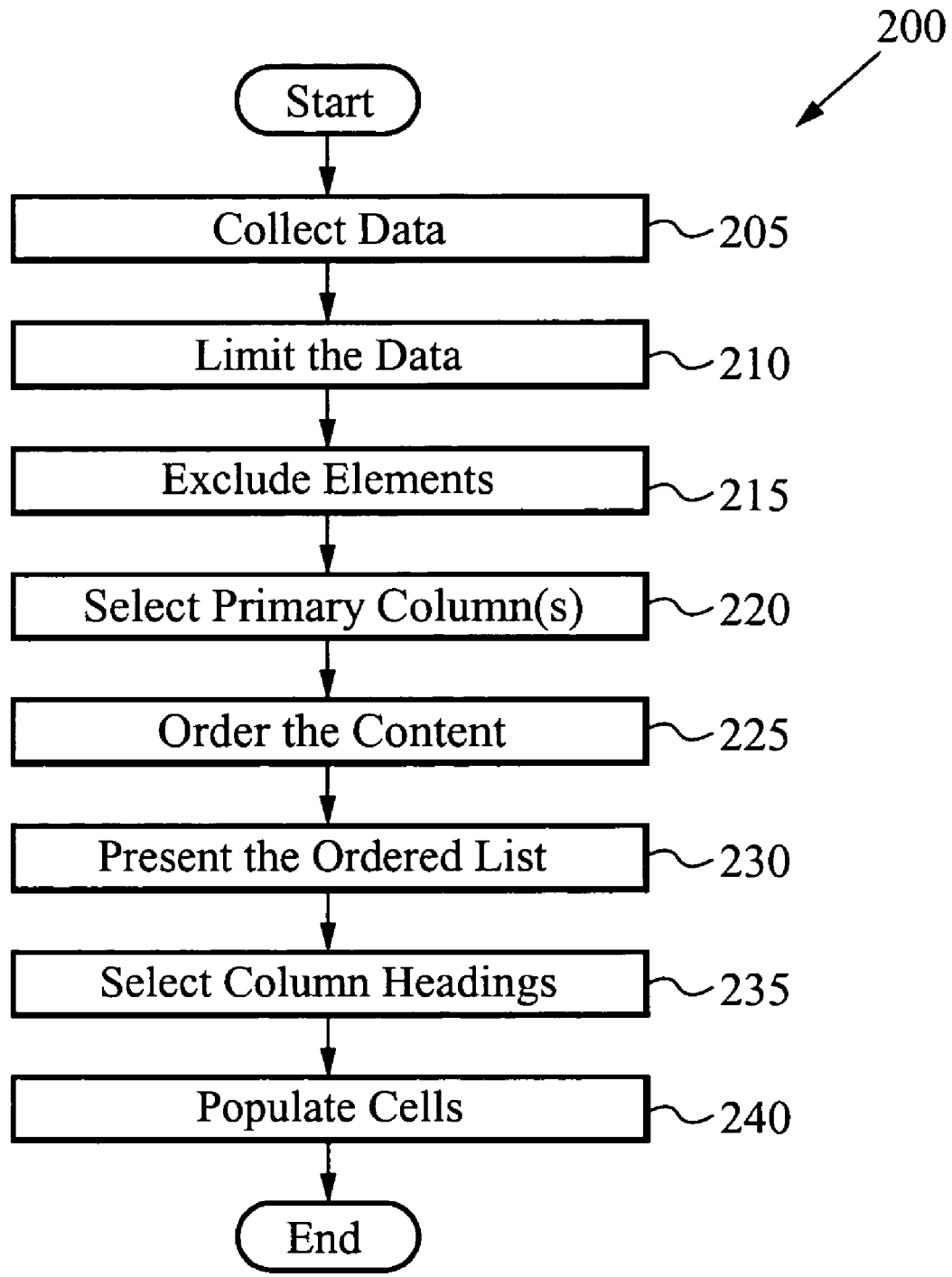
FIG. 2 is a process flow that illustrates a method of presenting data according to some embodiments of the invention.

FIG. 2 is a process flow that illustrates the method employed by some of the embodiments described above. As shown in this figure, the process 200 begins at step 205, where the available data that is associated with the media of interest is collected. As mentioned above, the data is typically available from a variety of sources that include home servers, personal computers, portable devices, and network sources, including Internet services. After the data are collected, the data are limited to those data elements for which the lens item is relevant at the step 210. In some embodiments, relevance is established when the lens item is part of the metadata for a particular data element. For example, if the lens item is a songwriter, the relevant data elements are typically limited to the songs that the song writer wrote. At the step 215, the irrelevant data elements are excluded. In some embodiments, the irrelevant data elements comprise the data elements for which the lens item is not a metadata element.

Once the data are limited and the irrelevant data are removed or excluded at the step 215, the first column and its appropriate heading are selected for the matrix related to the data element serving as the lens item at the step 220. For instance, in some embodiments, the first column heading for song writers is "Songs," while the first column heading for actors is typically "Movies" or "TV Shows." The first column of some embodiments contains the metadata field for which the lens item was most popular. Thus, if the lens item contains a person who is both a writer and a singer, but who sang in more songs than acted in films, the first column heading is typically the "Songs" heading, followed by the "Movies" heading. In these embodiments, the order of additional columns is specified.

After selecting the first column and possibly one or more adjacent column(s), the order of the data elements for each column is specified at the step 225. In some embodiments, the order of each column is alphabetical by name, while in some embodiments the order is by date of release or creation, and/or by time of last rendering by the system currently accessing the data. Some embodiments base the order on heuristically defined algorithms such as, for example, color, content mood, and embedded text.

Once the order is specified at step 225, the ordered list is presented as the first column of the display at the step 230. Then, at the step 235, the appropriate column headings are selected based on the metadata that are associated with the individual elements contained in each additional column. For example, if the first column contains a list of songs, the related (adjacent) columns typically contain metadata associated with the songs. Such associated metadata typically provide additional information regarding each song such as the composer, lyricist, recording artist, date of release, etc., for each song listed in the first column.

After the appropriate column headings are selected at the step 235, the cells are populated at the step 240. The process 200 then concludes. As mentioned above, in some embodiments, the process 200 further orders the data contained in each column, e.g., from most to least useful. Some embodiments provide an additional level of granularity of searching by using a lens item in a lens aware environment. In these embodiments, a user either searches the whole data set or a more limited data set represented by the elements filtered by using the lens item.

II. Data Matrix

FIGS. 3, 4, and 5 illustrate the columns and rows of a matrix presented to the user of some of the embodiments described above. Specifically, FIG. 3 shows an unpopulated matrix 300 comprising a lens field 305, a first row 310, a first column 315, and additional adjacent columns, such as, for example, a second column 320, a third column 325, a fourth column 330, a fifth column 335, and a sixth column 340). For the embodiments illustrated in FIG. 3, the lens field 305 is typically located above the first row 310. A user typically enters a lens item for access, presentation, and/or retrieval of data elements relevant to the entered lens item of interest. For instance, as shown in FIG. 3, a user has entered the lens item "John Doe" into the lens field 305. Some embodiments compile a data subset from the set of all data from the available data sources by using the lens item and by using the processes 100 and 200 illustrated in FIGS. 1 and 2, respectively.

Accordingly, the first column 305 shown in FIG. 3 contains an ordered list of data elements, in this example, songs, from a data subset that includes songs relevant to John Doe. The first row 310 of some embodiments is typically reserved for the appropriate column headings of the associated metadata in each column. Thus, in the example illustrated in FIG. 3, the representative headings include Song, Composer, Producer, Musicians, Release, and Playlist. Thus, FIG. 3 illustrates the state of the matrix 300 after the column headings have been selected but before the cells of the matrix 300 have been populated, as in the steps 135 and 235 in FIGS. 1 and 2, respectively. In some embodiments, the default column headings are preset based on the context, for example, "Playlist" where the content of the column contains music, or "Movie Titles" when the content comprises movies.

The additional columns 320-340 adjacent to the first column 315 are for additional data that are relevant to the data contained in each row of the first column 315. The additional columns 320-340 of some embodiments are also context sensitive, for example, have column headings that are dependent upon the nature of the content contained in each column. In some embodiments, the columns wrap such that the column to the right of the last far right column will appear as the last far right column as the user scrolls from left to right, through the columns presented in the display. For instance, the last column illustrated in FIG. 3 is the "Playlist" column 340, while the "Composer" column 320 is adjacent to the first column 315. In some embodiments, the "Composer" column 320 will appear adjacent to the right of the "Playlist" column 340, and so forth, as the user scrolls left-to-right through the presented columns in the matrix 300.

FIGS. 4 and 5 illustrate a subset of text metadata presented for display by some embodiments of the invention. These figures, illustrate two matrices 400 and 500 after the cells of the matrices 400 and 500 have been populated, for instance, after the processes 100 and 200 illustrated in FIGS. 1 and 2, respectively, have concluded.

Specifically, FIG. 4 illustrates the compiled data subset presented in landscape view, while FIG. 5 illustrates a portrait view of the same data subset. As shown in these figures, the data is laid out as a matrix, similar to a spreadsheet format. The advantage of the landscape view is that more columns are displayed, while the portrait view presents more rows from the data subset for display in the matrix. The data in each cell of the matrices 400 and 500 are dynamically based on a number of parameters that are described below. As shown in FIG. 4, the matrix 400 comprises a lens field 405, a first row 410, a first column 415, and additional adjacent columns (i.e., a second column 420, a third column 425, a fourth column 430, a fifth column 435, and a sixth column 440).

The first column 415 of the embodiments represented by the illustration in FIG. 4, contains songs listed alphabetically. However, one of ordinary skill will recognize that the data is ordered differently in other embodiments, for instance, by date of release. Other list orderings include by date of creation for material such as photos, by time last rendered for audio, video, and image files, or other subjective heuristically defined algorithms, such as, for example, color and mood. In different embodiments, different types of data occupy the first column 415.

A. Types of Metadata and Corresponding Appropriate Column Headings

As mentioned above, the data includes a variety of types. In some embodiments, the data are related to music, video, images, and other media and/or multimedia information. A brief review of some exemplary matrix formats for the various data types of some embodiments, follows. For music-type data, the column headings that reflect the associated metadata in each column includes, in some embodiments: Playlist(s), Album, Song, Artist, Genre, Composer, Writer, Musician(s), Conductor, Arranger, Producer(s), Date Released, and/or date last Played or Rendered, and Cover Art Director, Photographer, and/or Artist. For video-type data, which includes film, television, shorts, commercials, the appropriate column headings and associated metadata typically include: Shows, Lead Actor(s), Supporting Actor(s), Director(s), Date of Release, Producer(s), and Writer(s). For image-type data, the column headings and associated metadata of some embodiments include, for example, Slide Show, Date Taken, Place Taken, and time last Rendered.

The metadata and/or column heading(s) of some embodiments are user defined, such as, for example, "Participants in Photo," "Eiffel Tower Pics," and "Aunt Jenny on Vacation." In some embodiments, the metadata is heuristically generated, such as, for example, graphical metadata for identifying particular features in the images such as sunsets, water, portraits, etc., that are based on color, mood, or other predetermined and/or user defined criteria. In some embodiments the column headings are generated based on additional metadata types, for instance, appropriate column headings are "Game Title" and "Game Level" for game-based metadata. In some embodiments, the additional columns are related to text and/or documents and include such column headings as, for example: "Books," "Stories," "Periodicals," "Newspapers," "Personal Documents," and "Spreadsheets."

B. Navigation Through the Data by Using the Lens Item, Field, and Matrix

Navigation through a large data set by a user is performed in some embodiments by scrolling cell-wise through the matrix and/or by selecting one or more cells in the matrix. Movement through the matrix includes left, right, up, and down cell-wise scrolling. In some embodiments, the selection of a cell enables the contents of the cell to serve as a lens item. These embodiments facilitate the access and presentation of additional information that is relevant to the current data presentation or tangentially in a new data area. Some embodiments permit the highlighting of a cell to enable additional functionality by using the highlighted cell's data contents, for instance, to jump to a different data subset or organization of the large data set. For instance, FIG. 4 illustrates a highlighted cell that contains data for "Harry Belafonte." In some embodiments, the data in this cell are selected to provide further information. In some embodiments, the contents of the selected cell appear in the lens field 405, and the matrix 400 is updated to reflect further information regarding Harry Belafonte.

The area above or below the first row 410 is reserved in some embodiments for the lens field 405. The lens field 405, is the location in the user interface of some embodiments where a user may insert and/or modify the lens item. The lens item provides the criteria by which some embodiments perform several data access, organization, and/or presentation functions such as the search, sort, and filtering described above in relation to FIGS. 1 and 2. A data element which is entered into the lens field 405, becomes the lens item, which, for example, in some embodiments serves as the focus for determining relevant data from the set of available data. The data set is searched, sorted, and/or filtered to yield a subset of only relevant data that is of interest. The matrix 400 is then presented to the user for viewing and additional data access, organization, and/or presentation functions. The lens field 405 of some embodiments is not limited by the dimensions of the matrix used to present the data.

The cell at the intersection of the first column 415 and the first row 410 is the first cell. When a cell is selected in the matrix 400, the data contents of the selected cell move to the lens field 405 and also to the first cell. All other columns 420-440 maintain position to the right of the selected cell, which becomes the first cell, in some embodiments. As described above, the column headings of some embodiments wrap. The columns and rows of the matrix typically follow the ordering rules described above. Also mentioned above, the data are listed in various ways, such as, for example, alphabetical order, date of release, and/or date last rendered.

When navigating through the matrix 400, such as, for example, scrolling cell-wise up, down, left, or right, the columns and rows scroll to make the new columns and rows visible. Most rows and columns of the matrices representing the large data set and even the smaller data subsets are not visible at any one time. Even though the first cell is scrolled out of view in some embodiments, the data in the visible columns and rows still maintain position relative to the lens field 405, which remains visible throughout navigation of the matrix 400. The column headings in the first row 410 of some embodiments also remains visible during navigation so that the user is constantly reminded of the organization of the voluminous data being presented.

The lens field 405 of some embodiments contains a category. For instance, the lens item in the lens field 405 of these embodiments, includes an item that also appears as a column heading in some embodiments. When the lens field 405 contains a category, the first column 415 typically remains in place when scrolling to the left or right to the additional screen area that did not fit within the viewable area of the particular display. In these embodiments, the data elements listed in the first column 415 are limited to the members of the category currently serving as the lens item.

C. Changing the Lens Item

As soon as a data subset is selected for viewing and/or navigation, e.g., once the category of songwriters is selected for navigating via scrolling, the data set associated with that whole category is moved to memory. Some embodiments move to memory only a subset of the entire set of available data. In some embodiments, this first memory subset is a larger subset than will eventually be displayed if a new lens item is chosen. In some embodiments, a database of the previous lens items and each previous associated data subset is compiled and organized in such a way as to enable the caching of spatially and/or temporally related data. In some embodiments, the same data subset is replicated multiple times so that it is ready for presentation on the display screen as quickly as possible, as the needed associated data is accessed. Alternatively, or in conjunction with these embodiments, the data subsets relevant to the previous lens items are kept in a format that enables them to be quickly accessed.

In some embodiments, a user pauses while scrolling through the data matrix to allow the highlighting to settle for a moment on a particular cell. In some embodiments, the newly highlighted cell automatically becomes the current lens item. In these embodiments, a second memory subset based on the category of the highlighted cell is loaded to a different memory location. When a cell is selected for migration to the lens field, such as, for example, when the cell's contents are selected to serve as the next lens item during data set navigation, some embodiments minimize the latency of the data access by a number of additional methods. For instance, if the current lens item has already served previously as a lens item, the previously stored data subset relevant to the redundant lens item is already available, such as, for example, from memory, and accessible for immediate presentation. Even if the current lens item has not previously served as a lens item, and its relevant data subset has not been previously presented, some embodiments pre-cache in a buffer the current relevant information for presentation and/or rendering with minimal latency from the buffer.

In some embodiments, the data structure is laid out in such a way that the lens item is displayed first with the data elements of the relevant subset displayed from nearest to furthest. In some embodiments, the relationship is spatially based to insure that the part of the relevant data subset that is within the visible window of the particular display is presented first. The display screen size of some embodiments, is relatively small in comparison to the entire data set and the relevant data subset. In these embodiments, the user is provided a high quality experience by the quick updates presented on the small viewable display screen. In the event that the new lens item to be displayed is the result of the user scrolling through the data matrix by using, for example, a scroll back function, the relevant data subset will likely be already cached from having been previously displayed, while the needed relevant data subset requested by, for example, a scroll forward function, is typically pre-cached.

D. The Expand Icon

As illustrated in FIGS. 4 and 5, the matrix 400 and 500 of some embodiments includes an expansion icon 445 and 545, respectively. The expansion icon of these embodiments provides a third dimension for navigation within the matrix of some embodiments. In these embodiments, many data elements contained in the cells of the matrix have multiple members and some columns of the matrix represent super categories or sets and super sets of other elements. For example, a playlist typically has several songs associated with the playlist, while a movie has multiple actors in the movie. Television series typically consist of multiple individual shows, books contain chapters, series of books contain individual books, and games often have multiple episodes, stages, or levels.

However, because the display screen size of the physical embodiments typically used to view the data matrix is limited, the default position for the expansion icon of some embodiments is closed. When the expansion icon of these embodiments is closed, the cell having the closed expansion icon presents only a single data element, such as, for example, the lead actor of the movie, or the first song of the playlist. In the embodiments shown in FIGS. 4 and 5, a cell that contains multiple members has a downward pointing arrow 445 and 545 in the right portion of the cell. In these embodiments, a user views the additional relevant items associated with the particular cell having the closed expansion icon, by clicking on the closed expansion icon to open it. Some embodiments provide the additional information by populating additional row(s) in the matrix. In some of these embodiments, the arrow changes to an upward pointing arrow to indicate that the expansion icon has been selected. However, one of ordinary skill will recognize that the expanded hidden data elements of the cell is presented differently in different embodiments, such as, for example, through a drop down list.

Figure 6:
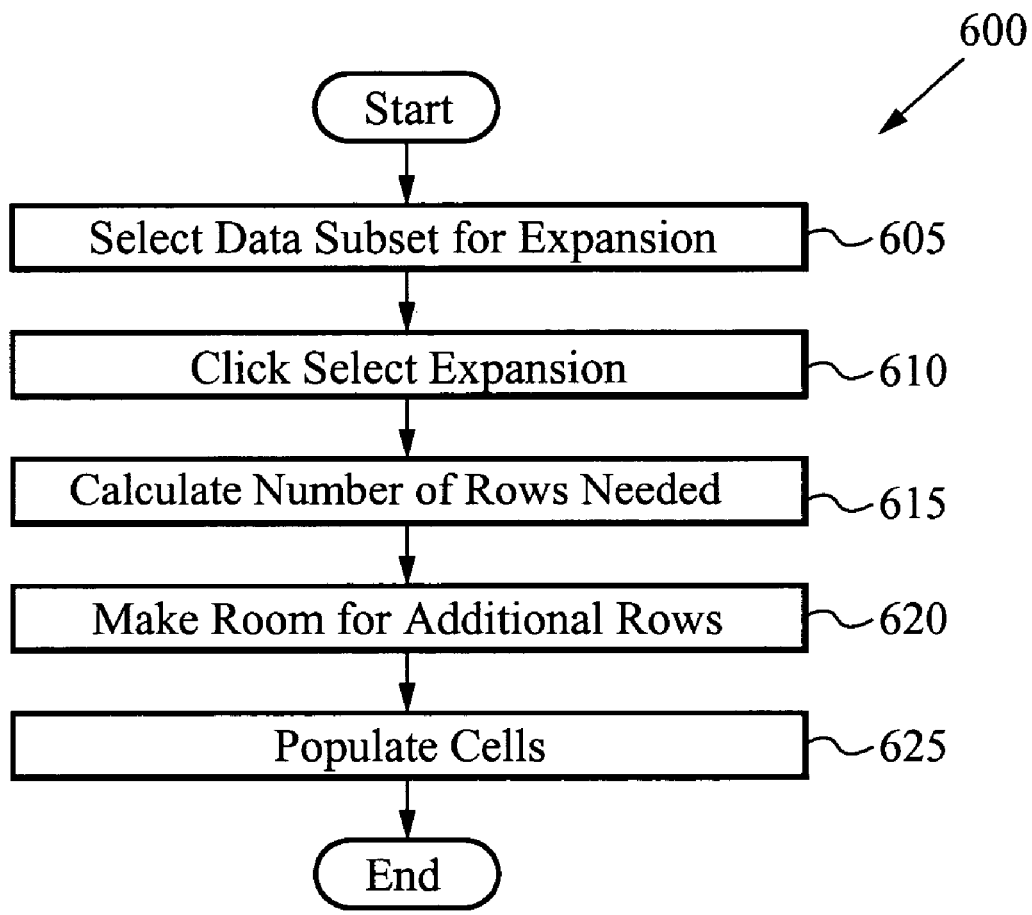
FIG. 6 is a process flow that illustrates a method of presenting an expanded data subset.

FIG. 6 illustrates a process 600 employed by some embodiments to expand a cell's data contents. The process 600 begins at the step 605, where a data subset is selected for expansion. As mentioned above, the data subset in these embodiments typically only contains relevant data out of the entire large set of data from the available sources. The data subset typically includes the elements that are initially visible, for example, the lead actor, in addition to the elements that are not visible, for example, all the actors in the particular movie. Although the hidden data is not displayed, the entire data subset is typically cached to memory. Next, at the step 610, the expansion icon is selected, to open the hidden data elements represented by the particular cell in the matrix. Then, at the step 615, the number of rows needed to display the additional data is calculated. Once the number of additional rows needed is calculated, the rows below the selected cell are moved downward to make room for the calculated number of additional rows needed at the step 620. After the number of rows below the selected cell is increased, the additional rows' cells are populated with the relevant data that was previously hidden from view at the step 625. The process 600 then concludes.

When a column containing an expanded cell is not the first column, the cells of adjacent columns in the expanded rows do not always contain and/or present data. When a column containing an expanded cell is the first column, the rest of the row is typically not blank, particularly where the column is a super column, such as, for example, a column containing data that has nested sublayers and/or subsets of data. For instance, if a playlist is expanded into its individual songs, the adjacent columns typically contain relevant associated data such as, for example, the artist and/or composer, for each song. The additional relevant information typically populates the adjacent cells of each row as illustrated above. Further, selecting the expand icon arrow of a cell while it is expanded, closes the open list and hides the additional members of the list, but typically leaves the now hidden data elements in memory cache.

E. Display of the Data Matrix When Scrolling

When scrolling slowly, the presented data matrix appears to crawl across the display screen. When scrolling more quickly, the selected cell, that is the cell highlighted in the data matrix of some embodiments, traverses a whole display screen of cells at a time. In these embodiments, the lens field typically remains fixed while the lens item within the field updates dynamically to reflect the latest data element currently highlighted and/or selected in the matrix currently being viewed with higher scrutiny. In some embodiments, when scrolling is performed very quickly, only the first letter or letters are displayed in the selected cell until scrolling stops or slows enough for a user to read the changing contents of the updating views of the matrix in the display screen. Because the display screen of some embodiments' user interface is designed to navigate large sets of data, some embodiments truncate the display based on the speed of scrolling so that the user can effectively determine the current navigational position in the matrix that is presented in the display screen.

In some embodiments, when scrolling through a temporally ordered list, the relevant dates are displayed instead of the individual elements. The data elements may have little relevance other than the temporal sequence of the date ordering. The row-by-row information presented in these embodiments is confusing because of the varied data. However, some embodiments present the dates in the order Year, Month, Day so that only the end of the displayed row will change most often while scrolling through the date ordered list. These embodiments provide a more convenient presentation of the data.

III. User Interface Device

Figure 7:
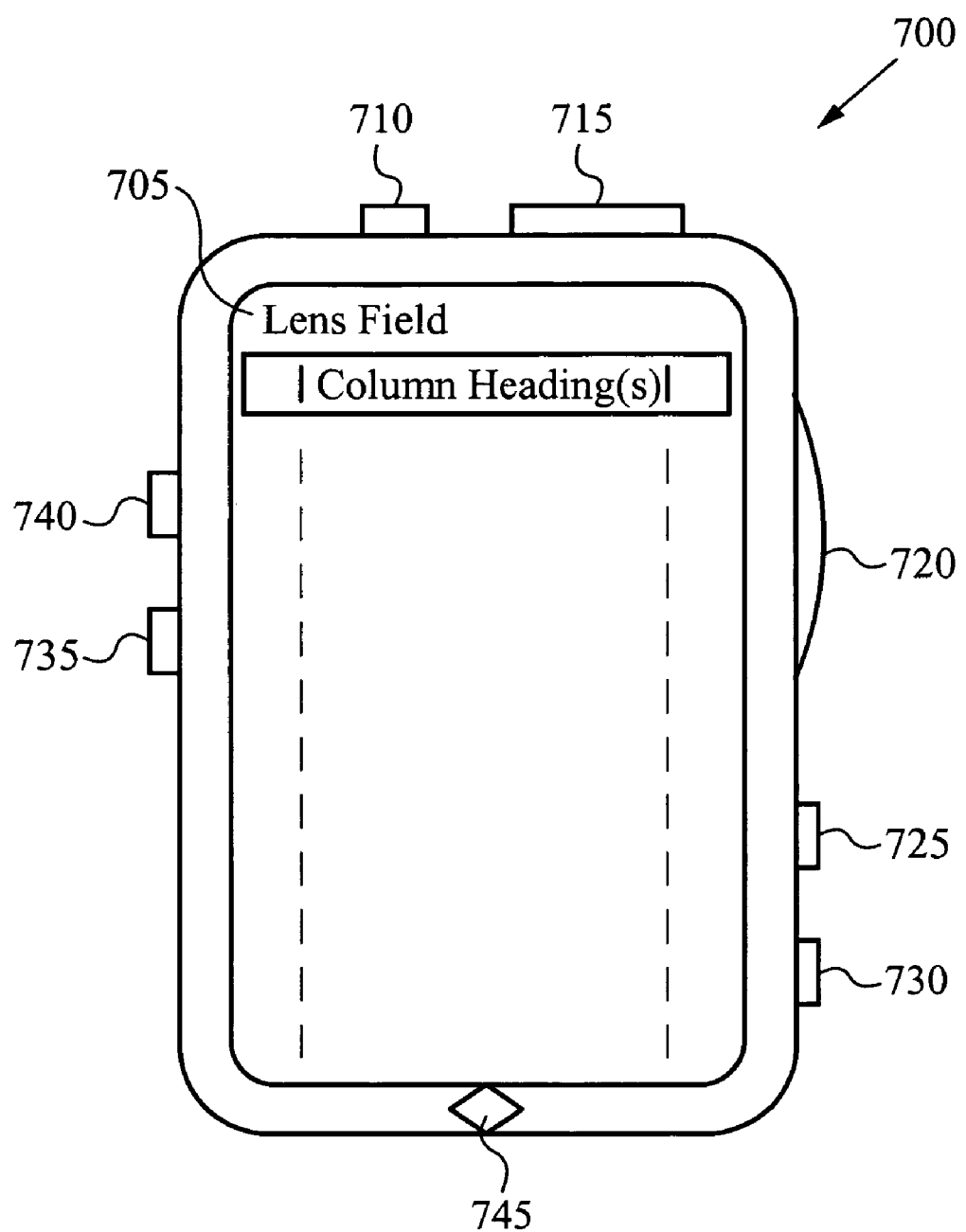
FIG. 7 illustrates a user interface device providing a portrait view of a data subset.

Some embodiments provide a user interface that allows a user to intuitively navigate through a large data set with minimal effort, and/or minimal user input. More specifically, some embodiments provide a user interface device as the means for a user to access, navigate, organize, and view the large data set in smaller subsets. FIG. 7 illustrates such a user interface device 700. As shown in this figure, the user interface device 700 includes a device display 705, an enter button 710, a communication module 715, a scroll wheel 720, a sort button 725, a bind button 730, a back button 735, and a forward button 740.

A. Communicating with External Devices and Sources Such as Storages and Networks The communication module 715 of some embodiments includes a data port for communication with other devices and/or network services. For instance, the communication module 715 of some embodiments communicates and integrates with several displays or other domestic appliances, such as, for example, DVD players, VCRs, cable boxes, stereos, and DVRs, by using, for example, infrared (IR) and/or radio frequency (RF) communication. The communication module 715 of some embodiments communicates with networked devices through a docking port, wire lines, or wireless communication, such as, for example, IR, RF, microwave, 802.11, and Bluetooth®. Network and non-network devices with which the communications port 715 connects include, for example, digital music players, computers, laptops, cell phones, PDAs, and digital cameras. Some embodiments support multiple simultaneous connections.

Figure 10:
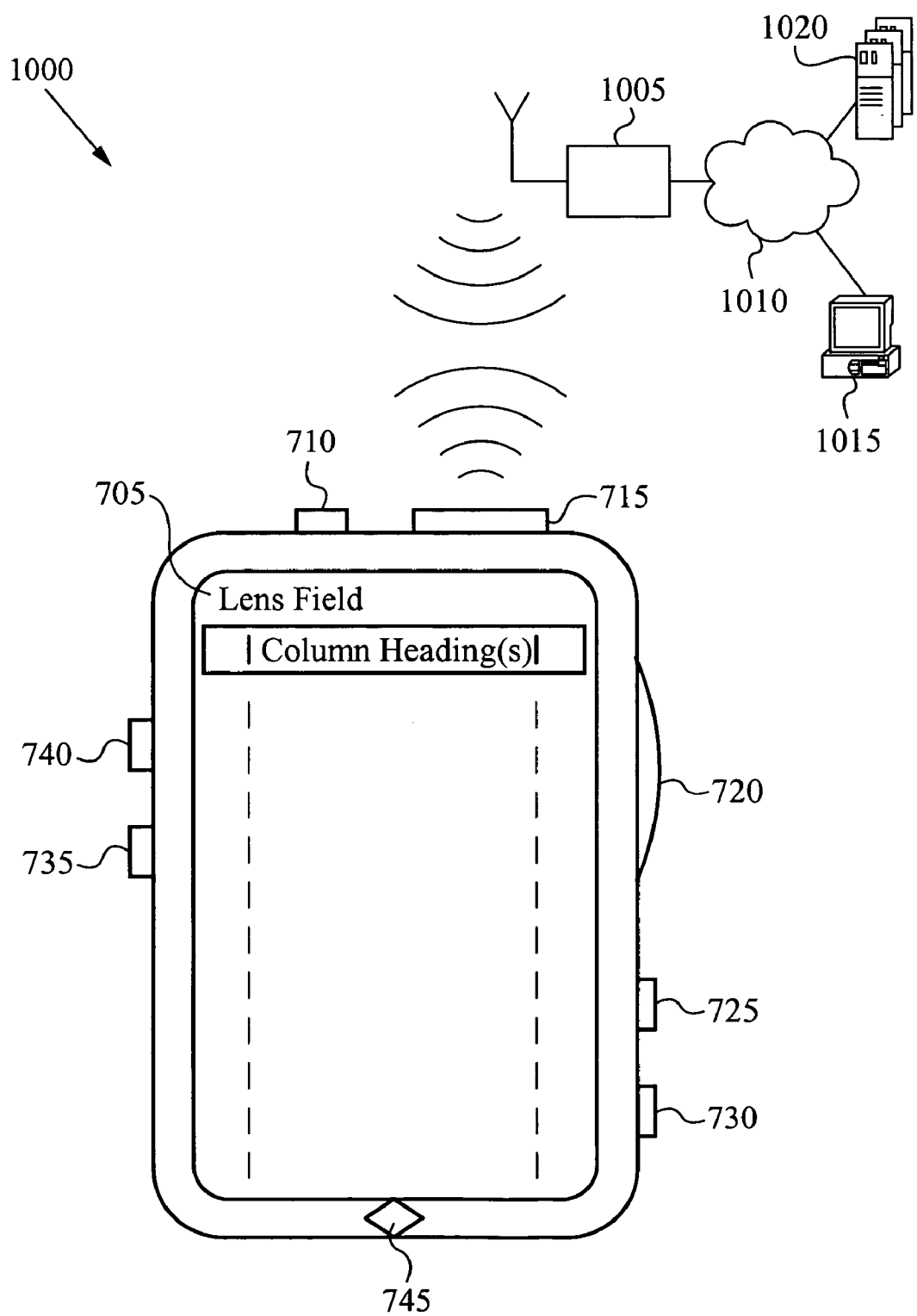
FIG. 10 illustrates a user interface device communicating with a plurality of devices through a network, according to some embodiments of the invention.

FIG. 10 illustrates the user interface device 700 of some embodiments connecting to a variety of external devices. Specifically, the user interface device 700 connects via a transceiver 1005 that is connected through a network 1010 to a variety of devices that include a computer 1015 and a server 1020. One of ordinary skill will recognize that the connections occur differently in different embodiments, such as, for example, wired, docked, wireless, and remote. In some embodiments, the connections are for sending, receiving, and/or both to and/or from the external devices. For instance, at times the user interface device 700 connects to the external devices to collect and/or receive data from one or more data sources, while at times the user interface device 700 connects to the external devices to send and/or render data to the external devices. For instance, the user interface device 700 of some embodiments attaches to a nearby audio system or component for rendering audio content presented in the data matrices compiled and presented as described above. In some embodiments, the attached audio system has access to its own store of content and metadata, while in some embodiments the external audio equipment has access to the content and metadata that is stored in the user interface device 700. Some embodiments of the device 700 connect to external displays or entertainment centers for providing and/or rendering the data in other ways.

B. Binding to External Devices Such as Monitors and Displays

Figure 11:
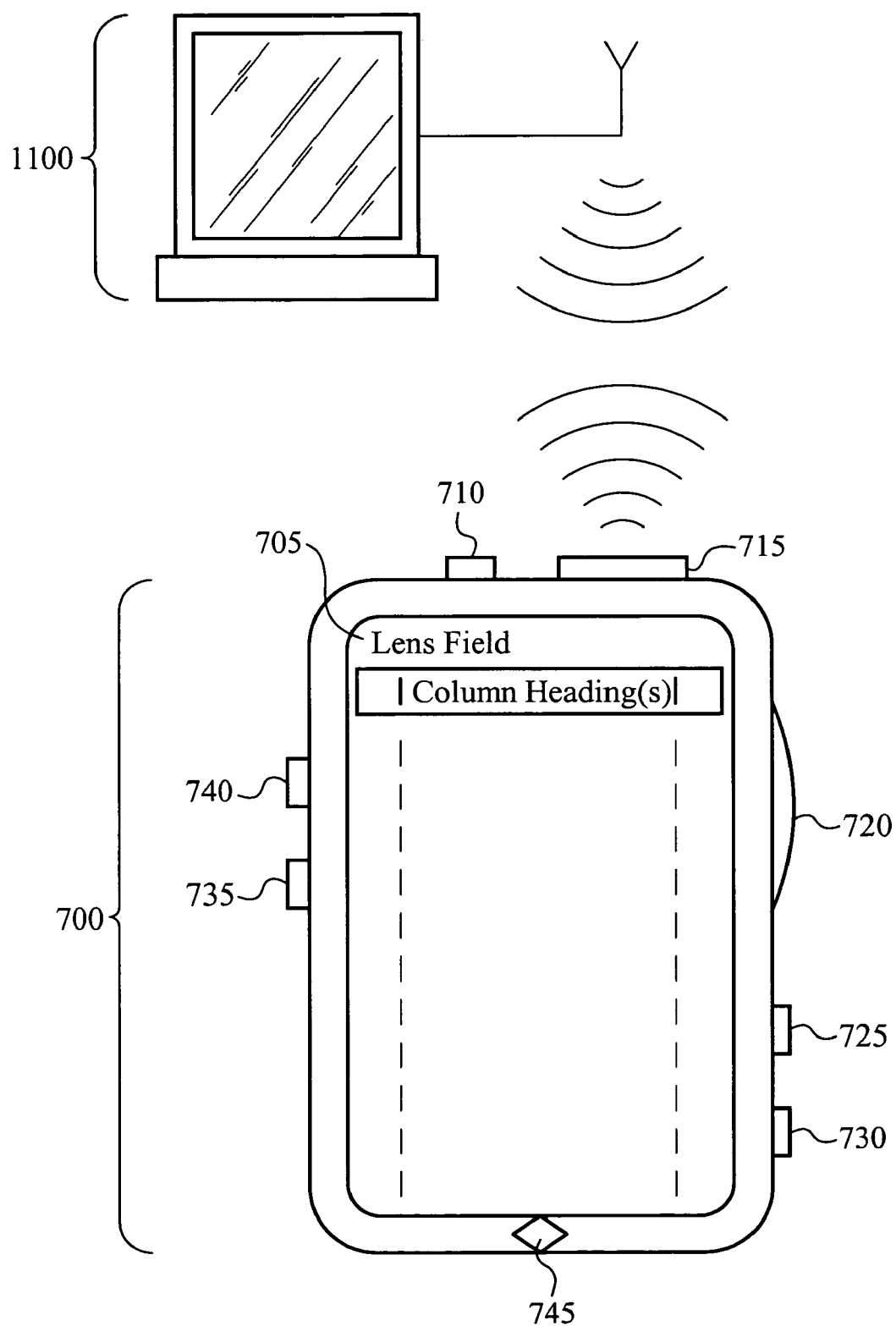
FIG. 11 illustrates a user interface device binding and communicating with an external display device.

As mentioned above, the communication module 715 is used by some embodiments to connect or bind to a variety of displays, devices, and/or peripherals that are external to the user interface device 700. FIG. 11 illustrates the user interface device 700 of some embodiments binding and transmitting information to an external display screen 1100. In these embodiments, the external display screen 1100 provides a number of functions, for instance, rendering of certain media data elements browsed and selected by using the user interface device 700.

In some embodiments, the user interface device 700 is used for remote control of one or more external devices. The user interface device 700 of these embodiments is capable of selecting an external video display from a set of displays and binding to the selected display. In some embodiments, the binding is for display only and does not affect the content associated with the attached display, while in some embodiments, binding to the external display device is for rendering the media data. If the attached display is to render content, it either has access to its own store of content and metadata or it displays the content and metadata that is stored in the user interface device 700. As mentioned above, the user interface device 700 of some embodiments further includes additional features for interaction with a user and a set of external devices such as entertainment system components. These features include the additional buttons of a remote control device, in some embodiments. Such a user interface device controls and/or renders data content on one or more external devices. In some embodiments, the user selects from a set of external devices over a variety of communications modes, such as, for example, IR, RF, and 802.11. The remote control feature of some embodiments is further described below in relation to FIG. 12.

In some embodiments, once data elements are selected for rendering, their media content are rendered on either the remote display, audio/video component system, and/or another external device. Regardless of whether the user interface device of these embodiments is used to drive an external device, such as an external display, the user interface device 700 of some embodiments has a built in device display 705. The device display 705 displays data and information fields, such as, for example, a full display of options and data matrices such as the matrices described above, or just information as needed, for instance, to select from a number of available external devices, display screens, and/or monitors.

1. Bind Button

Figure 13:
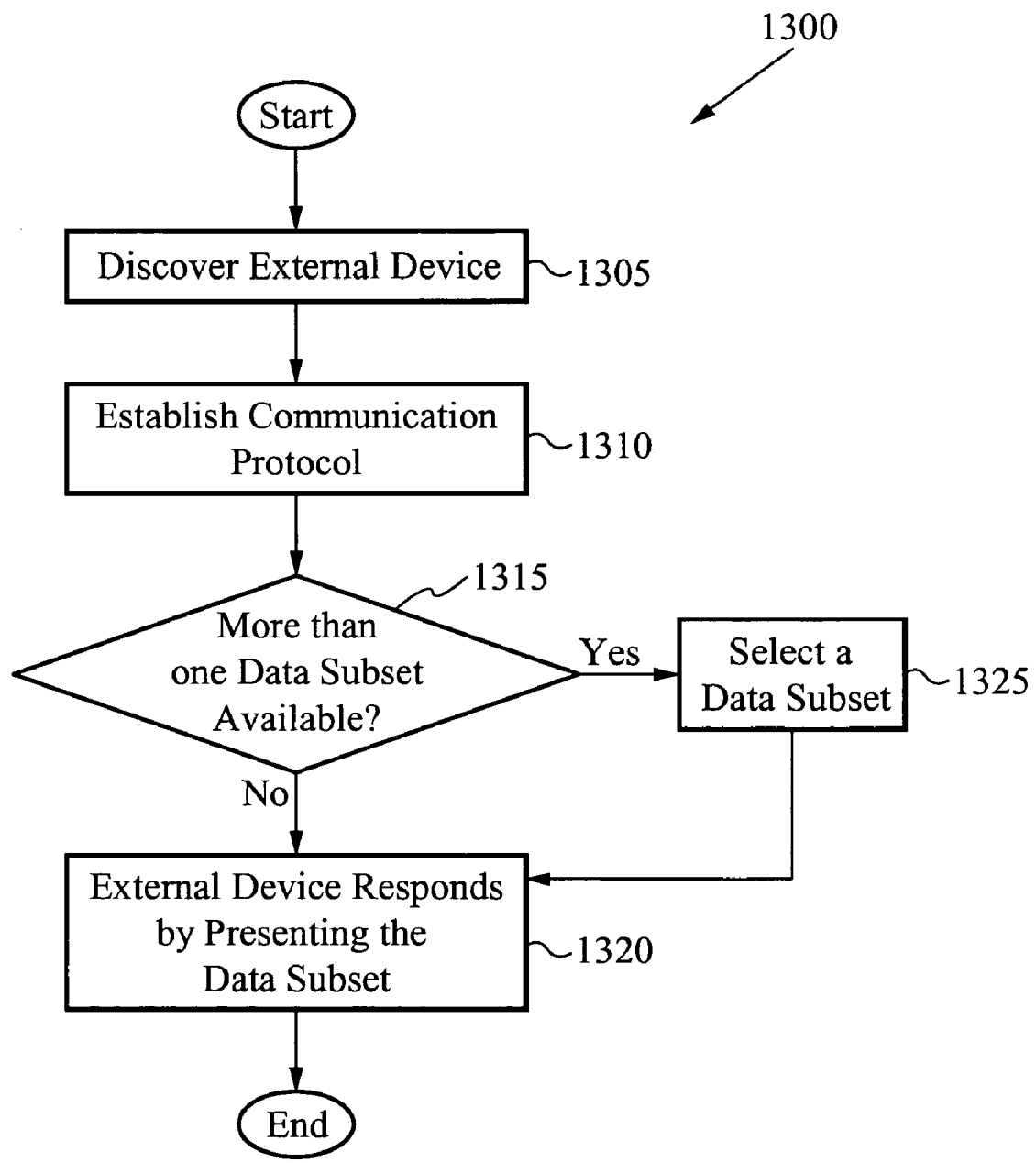
FIG. 13 is a process flow that illustrates the bind process of some embodiments.

The bind button 730 of some embodiments is used for binding the buttons and scroll wheel(s) of the user interface device 700 to an external device such as, for example, an external display. The bind button 730 binds the user interface to the external device to allow the user to access or control the external device. Some embodiments perform binding by using a bind process 1300 illustrated in FIG. 13. The bind process 1300 of FIG. 13 begins at the step 1305, where a user presses the bind button 730 and the user interface device 700 discovers the external device. The process 1300 of some embodiments uses a discovery device. The discovery device of some embodiments typically involves a wireless mechanism, such as, for example, IR for line of sight, RF or IR repeater, if the line of sight is interrupted by a physical feature, such as a wall. The process 1300 of these embodiments typically discovers the external device by pointing the user interface device 700 at the external device such as an external display, or a television, for instance.

Once the external device is discovered, the communications protocol is established at the step 1310. In some embodiments, the data communication between the user interface device 700 and the external device uses the same protocol(s) as the discovery device of the step 1305, while the communications protocol of some embodiments is different. For instance, the discovery mechanism of some embodiments uses IR for ease of pointing and selecting, but the data communications channel uses 802.11 because of the required throughput. When the communications protocol has been established, it is determined at the step 1315 whether more than one data subset is available. If more than one data subset is not available, then at the step 1320, the external device responds by presenting (displaying, playing, and/or rendering) the available data. If there is more than one subset of available data, then, at the step 1325, the appropriate data subset is selected from among any possible combination of the available data subsets. In some embodiments, the data subsets are the data associated with:

(1) the external device, if the external device is a portable device with its own storage;

(2) the external device, if the external device is a display that is directly connected to a set of data, and/or (3) the network, if the external device is associated with either a local or wide area network that is accessible from the external device, or in some cases, by using a remote control unit for the external device. Once the available data subset is selected, the external device presents the selected data subset at the step 1320. The process 1300 then concludes.

C. Orientation

In some embodiments, the device display 705 displays the data in particular ways according to a user preference setting or an orientation of the user interface device 700. In some embodiments, the user interface device 700 further includes an orientation module 745 for determining whether the device 700 is held vertically, with the scroll wheel 720 positioned to a side, or horizontally, with the scroll wheel 720 positioned on the top or bottom in relation to the device 700. In some embodiments, the orientation module 745 further determines if the user interface device 700 has been rotated clockwise or counter-clockwise. Orientation and rotation determining means are both known in the art and include, for example, IC chips, mercury switches, and gyroscopes. Further, the orientation module 745 of some embodiments includes an accelerometer means to determine the speed at which the user interface device 700 is being rotated. The significance in some embodiments of the user interface device's orientation will be described in the next section.

D. Navigation by Using the Scroll Wheel

The scroll wheel 720 of some embodiments is a knurled wheel set, which is typically rotatably mounted in the side of the case of the user interface device 700. The scroll wheel 720 of some embodiments is also clickable, meaning the wheel 720 is depressed similar to a button to enable or execute a function. The scroll wheel 720 allows viewing of data that does not fit in one page view of the device display 705. In some embodiments, the wheel 720 is mounted on the right side of the user interface device 700, while in some embodiments the wheel 720 is mounted on the left side or, alternatively, both sides. In some embodiments, one scroll wheel provides multiple functions that are user selectable based on various parameters, for instance, the orientation of the user interface device 700. Some embodiments provide several separate scroll wheels, such as, for example, four separate wheels, to separate the functions of one wheel into four user selectable wheels. In the embodiments having four separate scroll wheels, each wheel is positioned on each side of the device 700. Regardless of the location or number of wheels, the functionality of the scroll wheel 720 of some embodiments is as follows.

When the user interface device 700 is in the portrait orientation, as in FIG. 7, rotating the wheel 720 up moves the highlighting, that is around the currently selected (highlighted) cell, up through the cells of the presented matrix. Further, when the next to the top row is reached the highlighting remains fixed at that row such that the cells scroll upward under the fixed row. Rotating the wheel 720 down moves the highlighting downward and when the next to the bottom row is reached the highlighting remains fixed at that row such that the cells scroll downward under the fixed row. Clicking the wheel 720 moves the contents of the selected cell to the lens field 705, in some embodiments. In some embodiments, the contents of the selected cell is moved to the lens field 705 by using another button, such as, for example, the enter button 710.

Figure 8:
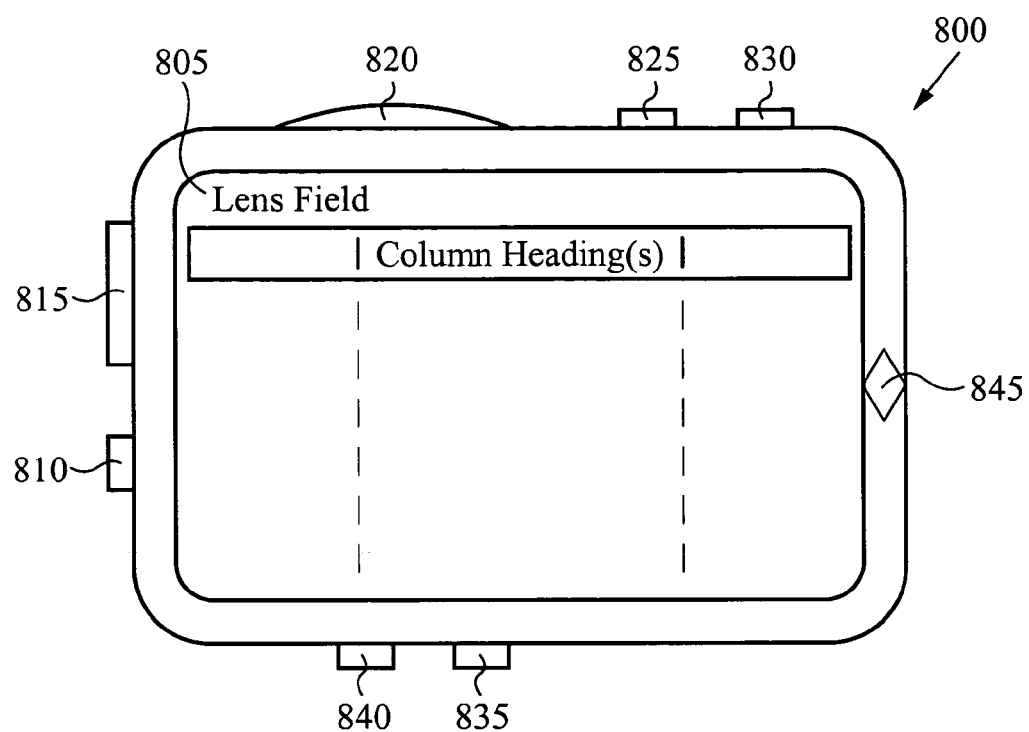
FIG. 8 illustrates a front view of a user interface device rotated to provide a landscape view of a data subset.
Figure 9:
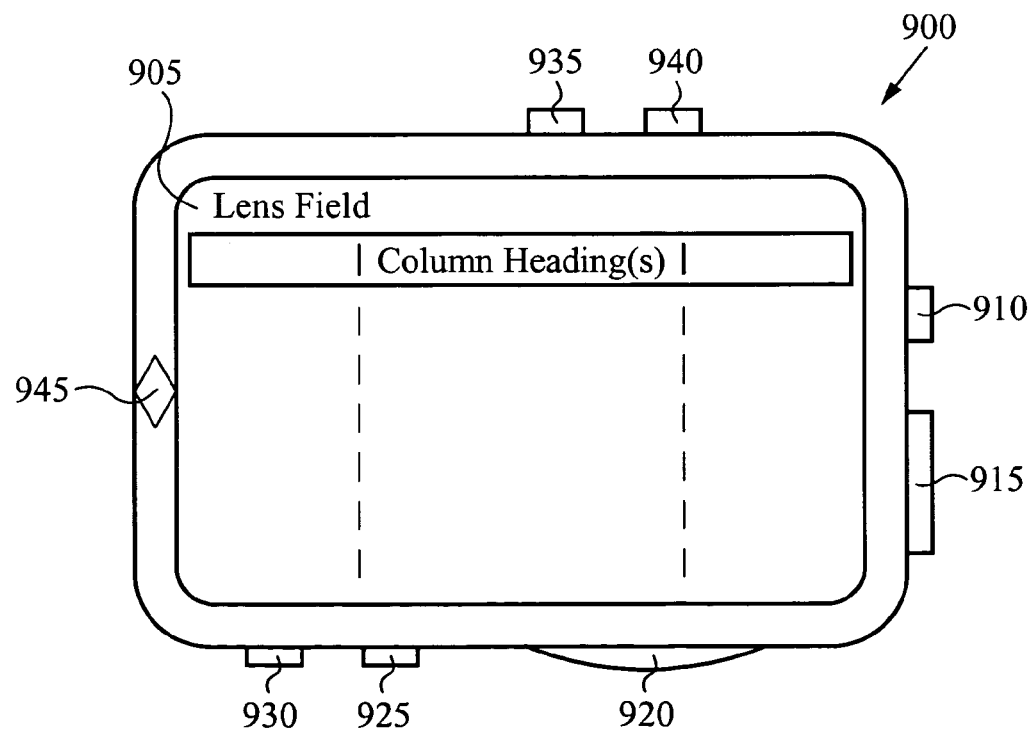
FIG. 9 illustrates another orientation of a user interface device providing a landscape view of a data subset.

FIG. 8 illustrates the user interface device 800 rotated to a horizontal landscape position. FIG. 9 illustrates that the landscape orientation is achieved by rotating the user interface device 900 to either of its horizontal sides. As illustrated in FIG. 8, when the user interface device 800 is positioned in the landscape position, rotating the wheel 820 scrolls the data left or right. More specifically, rotating the wheel 820 to the right moves the highlighting to the right through the cells. In these embodiments, when the rightmost column is reached, the highlighting remains fixed and the cells scroll to the left out from under the fixed column. Rotating the wheel 820 left moves the highlighting left and when the leftmost column is reached, the highlighting remains fixed and the cells scroll to the right under the fixed column. As mentioned above, one of ordinary skill will recognize several variations of the embodiments that do not depart from the present invention, such as, for example, variations in the number, placement, and function of the scroll wheels, buttons, and other implementation details of the device(s) described above.

Additionally, clicking the scroll wheel 820 has numerous functions, in different embodiments. In some embodiments, clicking the scroll wheel 820 executes an expand/contract function similar to that described above in relation to the expansion icon, while in some embodiments, the expand/contract function is performed by another button, e.g. the enter button 810. Also described above, clicking the scroll wheel 820 of some embodiments selects a data element for the lens item and moves the contents of the selected cell into the lens field 805. The scroll wheel 820 of some embodiments further features the following functions, in addition to others:

(1) Variable—the longer the wheel is held in an up or down rotated position, the faster a function is performed, such as, for example, scrolling. The wheel of these embodiments is spring loaded and returns to center when released.

(2) Multi-jog, up or down—two jogs increases the rate of a function and three jogs provides an even greater increase. In these embodiments, the wheel is typically spring loaded and returns to center when released.

(3) Continuously Variable—the wheel spins freely, with optional detents, and increases the function performed with the angle of its rotation. For instance, in some embodiments, the first motion, for example, between 10° and 40°, creates a slow scrolling effect, e.g., line-by-line. However, continuing to rotate the wheel in the same direction increases the scroll speed, e.g., page-by-page. Reversing direction slows the scroll speed until it finally stops and then accelerates in the opposite direction.

In some embodiments, the physical feel of the wheel is such that a user easily navigates (scrolls) slowly in one direction and then scrolls back slightly, not necessarily the exact number of degrees or speed as the movement in the original direction, and the scrolling will slow or stop in either direction. In the same way, the user of some embodiments navigates forward through a data matrix. By rotating the wheel further in the same direction, the matrix will scroll faster forward. The user of these embodiments similarly slows or stops scrolling by rotating the wheel back slightly. The motion of the wheel is such that changing speeds or stopping is intuitive and convenient. In some embodiments, clicking the scroll wheel at any speed stops the scrolling. Clicking the scroll wheel again (double-clicking) in some embodiments moves the contents of the currently selected cell into the lens field for navigation based on the new criteria.

The sort button 825 of some embodiments changes the ordering of the currently presented data subset. In some embodiments, the ordering is context sensitive depending on the data content of the subset. For example, the content based ordering of some embodiments switches between, for example, alphabetical ordering, release date, photo taken-on-date, and/or date last rendered. Less common orderings are available in some embodiments by pressing the sort button 825 in conjunction with another button, for example, the enter button 810. Less common or more sophisticated orderings include, for example, mood (for music); color (for pictures); genre (for television shows, music, articles).

E. Additional Embodiments of the User Interface Device

1. Voice Activation

Some embodiments of the user interface device include voice or audio recognition that permit a user to activate the features of the user interface device by voice command, for example, by speaking into the device commands such as "up, faster . . . faster, pause." These embodiments include a recognition module that receives and interprets commands to perform various functions described above such as, for example, scroll the data, select lens items, rotate the text, communicate with other devices, and update the data set.

2. Remote Control Devices

Figure 12:
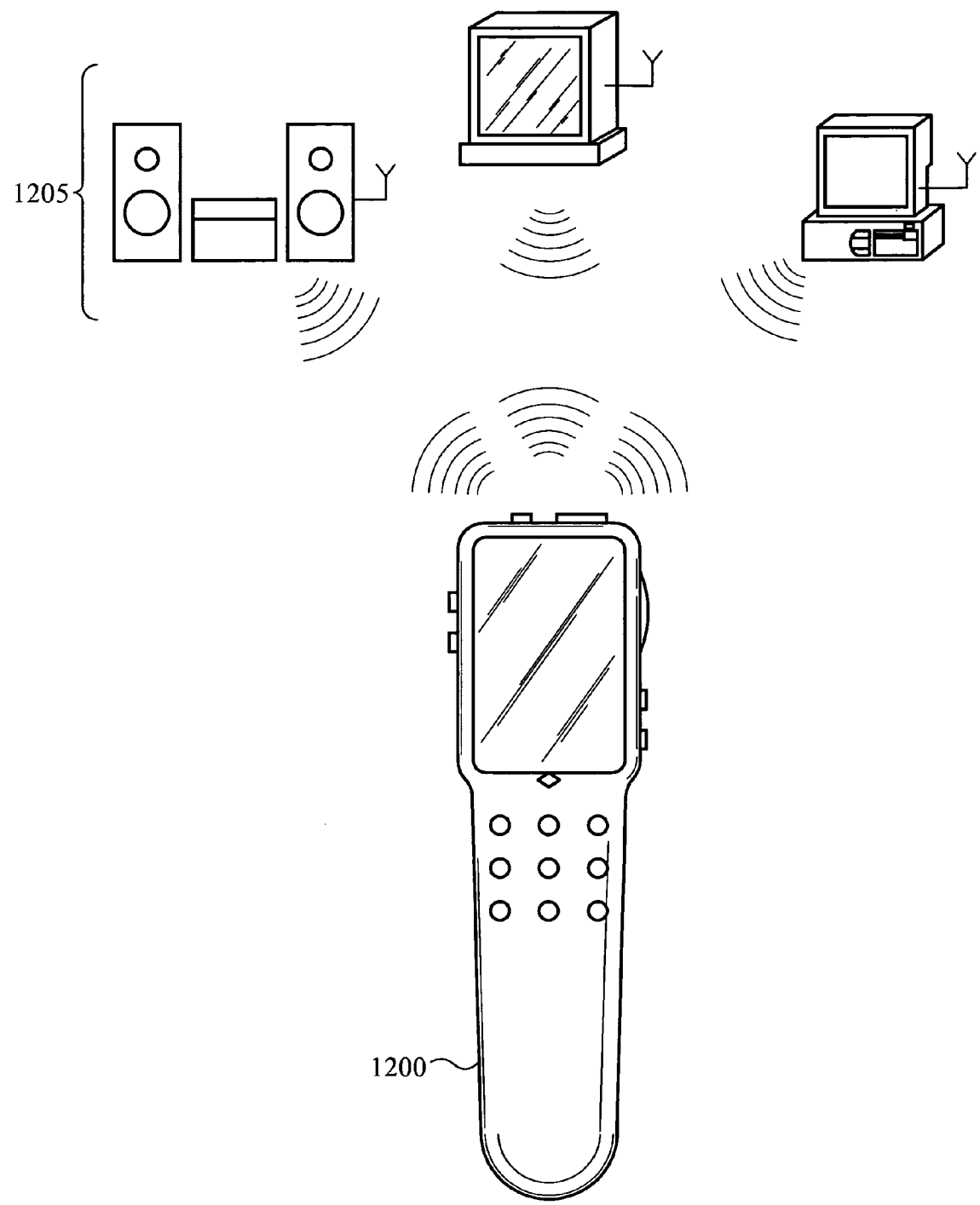
FIG. 12 illustrates a user interface device communicating with a plurality of external devices.

The user interface device of some embodiments provides control of one or more external devices in addition to access and functionality to navigate through data in an intuitive and efficient manner. FIG. 12 illustrates the user interface device 1200 of some embodiments communicating with a plurality of representative external devices 1205. As shown in FIG. 12, the user interface device 1200 of some of these embodiments includes many buttons of standard remote control devices and/or portable players, for example, play, pause, fast forward, rewind, and menu. Although described in relation to the user interface device of the embodiments described above, one of ordinary skill will recognize that any or all of the described functions and features of the user interface device is capable of incorporation into any number of devices, such as a portable media player, or a remote control device, as, for example, for a television, VCR, and/or audio component.

3. Display Screen—Dynamic Aspect Ratio

In some embodiments, the display screen has horizontal text regardless of how it is turned. For instance, the display screen presents a landscape view regardless of the orientation of the device, for example, with the buttons above, below, to the left or right. In the portrait view of some embodiments, there is typically room for more rows than columns and in landscape view, more columns than rows. The method of keeping the text horizontal includes the following steps in some embodiments: (1) determining if the device is held in a substantially vertical orientation, whether it was previously in a landscape or portrait view; (2) aligning the text in the display, and the appropriate dimensions of the cells, so that the text reads in the appropriate direction for the language being used, such as, for example, from left-to-right for the English language. The result is that if the device is rotated 90 degrees, the text will rotate 90 degrees in the opposite direction to remain legible; (3) if the device is not held in a substantially vertical orientation, a predetermined default view is adopted by some embodiments, for example, either portrait or landscape; (4) when the device is rotated at a reasonable speed of rotation, such as, for example, 15 RPM, over greater than 70 degrees, the text rotates 90 degrees in the opposite direction.

Additionally, in some embodiments, the functionality of the scroll wheel(s) is affected by the rotation of the display screen such that when the display screen switches from a landscape to a portrait view, vertical scroll wheels act as horizontal scroll wheels and horizontal scroll wheels act as vertical scroll wheels.

4. Example

The following illustrates an example of how a user interacts with some embodiments. The user interface device of some embodiments initially presents a portrait view of a matrix that represents a particular data subset. The data subset includes movies in alphabetical order. In this instance, the user interface device collected the movie data subset by connecting, for example, to a personal computer, a home DVD jukebox, and an online video subscriber service via the Internet. The movie data subset is large and a number of items are displayed at once as a user of the device scrolls quickly through the data. The user scrolls through the ordering of movies by using the scroll wheel on a vertical side of the device. The user stops at a particular movie and turns the device 90 degrees while still holding a thumb or finger on the same scroll wheel.

When the device rotates, the aspect ratio of the presented view changes from a portrait to a landscape view. The user is then presented fewer movies in the ordered list in the landscape view, however, the user does not require a listing of many movies because the user has already chosen a movie to view in greater detail. Instead, the user of these embodiments is presented a view containing more associated categories for each movie. By using the same scroll wheel, which was oriented initially as a vertical scroll wheel but is now oriented as a horizontal scroll wheel, the user scrolls across the categories to reveal additional the data (in columns) that do not fit within the horizontal/landscape view.

When the user reaches the column for the actor category, for instance, the user clicks the scroll wheel to expand the category to show all the actors in the particular movie. The user of some embodiments further rotates the device back 90 degrees to present more data elements in the actor category for the particular movie by using the vertically longer portrait mode. The user scrolls down through the actors and selects a (first) actor by again clicking the wheel. However, the user is currently clicking the wheel in the vertical device mode. The (first) actor currently selected by the clicking moves to the lens field and becomes the new lens item. The user views the data elements associated with the selected actor now serving as the current lens item, in even greater detail. The user then scrolls, in some embodiments, to the data field listing the movies in which the particular selected actor has played a part. Here, the user click selects on a second movie to move the second movie to the lens field. Likewise, the user chooses a second actor, a director, or a composer, for example, associated with the second movie to present and view data relevant to the selected person in the second movie in greater detail. One of ordinary skill will recognize the various manners in which this process continues. Further, in this scenario, the user selects a particular image or movie from the presented data matrix for rendering. Initially, the user chooses to render the selected data, for example, a movie, on the built in device display. Then, however, the user decides to select an external home theater system for rendering the movie by using the user interface device.

IV. Advantages

The lens field of some embodiments has the benefit of allowing the lens item to change very quickly, as well as move and jump dynamically while navigating through a potentially massive data set. The user of these embodiments effectively "surfs" through the data using an associative approach that more closely models the way by which memory and recall works. Typically, people remember things associatively and temporally. For example, one might recall seeing a particular product on sale, a tea set, in a store window on a particular street on a night of dining on the street, Main Street, with a particular friend, John. Without the additional associative cues, it is more difficult for the individual to recall the name of the store or the street address, in a vacuum, without any additional information.

The ability to surf through the data using associative and temporal cues has a significant impact on how quickly and successfully a user finds the needed information. The method of some embodiments leverages the information of primary, secondary, tertiary, relevance that is already known to the user. In contrast, general purpose search engines typically perform simple naked keyword look ups, in a vacuum, without additional cues regarding associative relationships.

Another benefit of the present invention is the reduction of latency. Specifically, the present invention reduces the latency caused by the reformatting and redisplaying of data on the particular display screen being used. For instance, some embodiments reduce display latency and provide fluid scrolling of the data matrix. Additionally, some embodiments minimize latency of data searching and presentation by buffering and/or associatively caching. For instance, the most recent views are stored in memory so that the steps of navigation can be traced backwards by using a back function and retraced forward by using a forward function of some embodiments. Some embodiments will store up to 40 previous views, while other embodiments will store another number of previous views. In some embodiments, the stored views provide a "history" that persists between the data navigation sessions. Traversing navigation screens often takes a circuitous path that is difficult to reconstruct. The ability to retrace previous steps assists a user in locating data in additional ways, for instance, based on chronological histories.

The concept of zoom has not been used as an intuitive mechanism for focusing on specific areas of large data sets. Some embodiments enable the user to set the viewable area to an appropriate size not only for the resolution of the particular viewing display screen but also to limit the field of view to parsable chunks of data for each particular user. These embodiments are particularly useful when viewing on a high resolution external display where the size of the font can be adjusted based on how close the user is to the display screen.

Moreover, the methods described above present a novel approach. Searching and navigation features have not typically been applied in non-computer environments. More specifically, searching by using the methods and apparatus described above are particularly fruitful when looking for data in large data sets. Some embodiments streamline user control and input. In some embodiments, a small keyboard is attached to the user interface device or other viewing apparatus of some embodiments to further enhance the searching and navigation functions. In some of these embodiments, the small keyboard is folded down for storage and optionally revealed to facilitate user input for faster searching.

While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

What is claimed is:

1. A method of accessing a data set, the method comprising:
    locating data elements stored on a plurality of different types of data sources, the data elements forming the data set;
    receiving a lens item, wherein the lens item provides a set of parameters for searching the data set stored on the plurality of different types of data sources;
    searching the data set by using the lens item to identify a data subset; and
    ordering data elements within the data subset into a plurality of columns, wherein the plurality of columns comprise super column.

2. The method of claim 1, the method further comprising:
    sorting a list of data elements based on the data subset, wherein the sorting generates an ordered list;
    filtering the data subset, wherein filtering the data subset comprises excluding the data elements that are not relevant to the lens item;
    displaying the ordered list as a matrix, the matrix having a plurality of columns, each column having the plurality of cells, wherein the cells of the matrix are populated with metadata based on the data subset;
    selecting column headings for the matrix; and
    populating the cells of the matrix.

3. The method of claim 2, wherein the data are sorted based on the content of the data.

4. The method of claim 2, wherein the data are sorted based on a set of metadata associated with each data element.

5. The method of claim 2, wherein the column headings are selected based on the content of the data in each column.

6. The method of claim 5, wherein the column headings are selected based on metadata.

7. The method of claim 2, wherein the populating comprises, for a particular cell in a row of the matrix, cross referencing the column heading for the column containing the particular cell with data in the first cell of the row containing the particular cell.

8. The method of claim 1, wherein a data source is remote.

9. The method of claim 1, wherein relevance is determined by using a set of data associated with the data subset.

10. The method of claim 1, further comprising storing the data subset for retrieval.

11. The method of claim 10, wherein the data subset is cached, the method further comprising: retrieving the data subset from the cache without the need for a search.

12. The method of claim 1, further comprising pre-caching a data subset from the data set.

13. The method of claim 1, wherein the super column comprises data having nested sublayers and/or subsets.

14. A method of selecting a first data element in a data set, the data set comprising a plurality of data elements, the method comprising:

locating a plurality of data elements from the data set stored on a plurality of different types of data sources, wherein the plurality of data elements includes the first data element for selection;

limiting the data set of data elements to a subset;

excluding a second data element from the subset;

selecting a set of columns, wherein the set of columns comprises a super column and further wherein a column comprises a plurality of data elements;

ordering the data elements in a list for a column in the set of columns, thereby forming an ordered list of data elements;

displaying a matrix comprising the selected set of columns, wherein a column in the matrix comprises the ordered list of data elements;

selecting column headings for each column in the matrix; and populating a plurality of cells in the matrix.

15. The method of claim 14, wherein the data set is limited by a relationship between the first data element and the plurality of data elements.

16. The method of claim 15, wherein the relationship is associative.

17. The method of claim 14, wherein a data element comprises associated metadata.

18. The method of claim 14, wherein the removed second data element is deemed not relevant to the first data element.

19. The method of claim 14, wherein the selected set of columns includes a first column, wherein the first column has a predetermined relationship to the first data element.

20. The method of claim 14, where the ordered list of data elements is for a first column, wherein the ordering is based on a set of meta data associated with the ordered list of data elements.

21. The method of claim 14, wherein the ordered list of data elements is presented as a first column in the matrix.

22. The method of claim 14, wherein a first column heading is selected based on the metadata associated with the data elements in the first column.

23. The method of claim 14, wherein the populating comprises, for a particular cell in a row of the matrix, cross referencing the column heading for the column containing the particular cell with data in the first cell of the row containing the particular cell.

24. The method of claim 14, further comprising ordering the column headings from most useful to least useful.

25. The method of claim 14, wherein the super column comprises data having nested sublayers and/or subsets.

26. A system for providing access to a data set, the system comprising:

a set of data elements comprising a first data source stored on a plurality of different types of data sources;

a first device for collecting the set of data elements, wherein the first device receives a first lens item for searching the data elements stored on the plurality of different types of data sources, wherein the first device filters the data elements by using the first lens item to generate a first subset, and further wherein the first device presents the first subset in a plurality of views for navigation through the first subset; and ordering the data elements within the first subset into a plurality of columns, wherein the plurality of columns comprise a super column.

27. The system of claim 26, further comprising a second data source, wherein the set of data elements comprises the first and second data sources.

28. The system of claim 26, wherein the navigation comprises scrolling through a displayed matrix that represents the first subset.

29. The system of claim 26, wherein the first subset contains a second lens item, wherein the first device determines a second subset by using the second lens item.

30. The system of claim 26, further comprising a second device, wherein the first device communicates with the second device for presentation of data on the second device.

31. The system of claim 30, wherein data is rendered on the second device.

32. The system of claim 30, wherein the first device controls the second device.

33. The system of claim 26, wherein the first device communicates with at least one external device.

34. The system of claim 33, wherein the communication comprises wireless communication.

35. The system of claim 33, further comprising a network, wherein the first device communicates with the external device through the network.

36. The system of claim 26, wherein the first device comprises a user interface device, the user interface device comprising:

a communications module for collecting data from the first data source;

a display screen for presenting a matrix comprising the plurality of columns, each column having a set of data cells, the matrix representing the first subset; and a set of controls for navigating through the matrix of data cells.

37. The system of claim 26, wherein the super column comprises data having nested sublayers and/or subsets.

38. A method of accessing a data set, the method comprising:

locating data elements stored on a plurality of different types of data sources, the data elements forming the data set;

receiving a lens item, wherein the lens item provides a set of parameters for searching the data set stored on the plurality of different types of data sources;

searching the data set by using the lens item to identify a data subset;

sorting a list of data elements based on the data subset, wherein the sorting generates an ordered list;

filtering the data subset, wherein filtering the data subset comprises excluding the data elements that are not relevant to the lens item;

presenting the ordered list in a first column of matrix, the matrix comprising a plurality of columns and a plurality of cells, wherein the cells of the matrix are based on the data subset, and further wherein the plurality of columns comprise a super column;

selecting column headings for the matrix; and populating the cells of the matrix, wherein the populating comprises, for a particular cell in a row of the matrix, cross referencing the column heading for the column containing the particular cell with data in the first cell of the row containing the particular cell.

39. The method of claim 38, wherein the super column comprises data having nested sublayers and/or subsets.

* * * * *